United States Patent
Kakani et al.

(10) Patent No.: US 6,775,533 B2
(45) Date of Patent: Aug. 10, 2004

(54) APPARATUS, AND ASSOCIATED METHOD, FOR TRANSFERRING DATA BETWEEN A FIRST TARGET ENTITY AND A SECOND TARGET ENTITY OF A MOBILE RADIO COMMUNICATION SYSTEM

(75) Inventors: Naveen Kumar Kakani, Denton, TX (US); Rene Purnadi, Coppell, TX (US); Yousuf Saifullah, Flower Mound, TX (US)

(73) Assignee: Nokia Corporation, Espoo (FI)

( * ) Notice: Subject to any disclaimer, the term of this patent is extended or adjusted under 35 U.S.C. 154(b) by 288 days.

(21) Appl. No.: 09/916,697

(22) Filed: Jul. 27, 2001

(65) Prior Publication Data

US 2003/0022654 A1 Jan. 30, 2003

(51) Int. Cl.[7] .................................................. H04Q 7/20
(52) U.S. Cl. ..................... 455/403; 455/560; 455/554.2; 455/436; 455/442
(58) Field of Search ................................. 370/331, 332, 370/335, 403; 455/436, 437, 442, 554.2, 560, 561

(56) References Cited

U.S. PATENT DOCUMENTS

| | | | | | |
|---|---|---|---|---|---|
| 5,889,769 | A | * | 3/1999 | Mizuno | 370/328 |
| 5,896,373 | A | * | 4/1999 | Mitts et al. | 370/331 |
| 5,940,371 | A | * | 8/1999 | Mitts et al. | 370/236 |
| 6,230,013 | B1 | * | 5/2001 | Wallentin et al. | 455/436 |
| 6,278,880 | B1 | * | 8/2001 | Sipila et al. | 455/436 |
| 6,301,479 | B1 | * | 10/2001 | Roobol et al. | 455/436 |
| 2002/0099854 | A1 | * | 7/2002 | Jorgensen | 709/249 |

* cited by examiner

Primary Examiner—William Trost
Assistant Examiner—Marcos L Torres

(57) ABSTRACT

Apparatus, and an associated method, for facilitating communication of a data block to a mobile station when a handover of communications is effectuated. A segmentation and distribution unit is positioned at a base station gateway, and the base station gateway is coupled to both a first target entity and a second target entity. Portions of the data block are provided to the first target entity to be communicated to the mobile station. When a handover of communications is effectuated, the buffered portion of the data which has not yet been successfully delivered to the mobile station is forwarded to the second target entity. And, other portions of the data block, not yet delivered to the first target gateway are, thereafter, provided directly to the second target entity.

17 Claims, 5 Drawing Sheets

APPARATUS, AND ASSOCIATED METHOD, FOR TRANSFERRING DATA BETWEEN A FIRST TARGET ENTITY AND A SECOND TARGET ENTITY OF A MOBILE RADIO COMMUNICATION SYSTEM

TECHNICAL FIELD OF THE INVENTION

The present invention relates generally to a manner by which to facilitate communication of a data block to a mobile station in which communications with the mobile station are handed off from a first target entity to a second target entity. More particularly, the present invention relates to apparatus, and an associated method, for transferring a portion of the data block, previously delivered to the first target entity, but not yet affirmed to have been successfully communicated to the mobile station, to the second target entity. Other portions of the data block, not yet delivered to the first target entity are provided directly to the second target entity to be communicated therefrom to the mobile station. Improved communication rates are provided without requiring a high bandwidth link between the first and second target entities.

BACKGROUND OF THE INVENTION

A communication system is formed, at a minimum, of a sending station and a receiving station interconnected by a communication channel. Data is communicated by the sending station to the receiving station by way of the communication channel. The data is converted, if necessary, into a form to permit its communication upon the communication channel. And, when received at the receiving station, the informational content of the data is recreated to permit use to be made of the data at the receiving station.

In a communication system in which the communication channel is formed of a radio channel defined upon a portion of the electromagnetic spectrum, the communication system is referred to as a radio communication system. A wire line connection is not required to interconnect the sending and receiving stations. In contrast to a conventional wire line system, communications are effectuable through the use of a radio communication system even when a wire line connection cannot be conveniently formed between the sending and receiving stations.

A cellular communication system is an exemplary type of radio communication system. Various cellular communication standards have been promulgated, and cellular communication systems have been implemented pursuant to such promulgated standards. And, additional cellular communication systems continue to be proposed. Improvements to existing cellular communication systems have similarly also been proposed.

A cellular communication system is implemented throughout a geographic area by positioning a plurality of fixed-site, base transceiver stations at spaced intervals throughout the area in which the communication system is to be implemented. Each of the base stations defines a coverage area, referred to as a cell, within which radio communications with a mobile station are possible. The base stations are controlled by cell gateways (CGWs), and the cell gateways are connected to a base station gateway (BSGW). The base stations, CGWs and BSGWs, are collectively referred to as the network infrastructure. A mobile station is used to communicate, by way of a radio link, with a selected base station. The mobile station typically is movable throughout the geographic area in which the communication system is implemented. The mobile station might initially, therefore, be positioned in a first cell, referred to as a serving, or source, cell and thereafter be repositioned in another cell, referred to as a target cell. Handover of communication with the mobile station from the base station encompassing the source cell to the base station encompassing the target cell permits continued communication with the mobile station.

While cellular communication systems were generally first implemented to communicate data using analog communication techniques, increasingly, cellular, and other, communication systems are constructed to permit communication of data utilizing digital communication techniques.

When digital communication techniques are used, typically, the data to be communicated is first formatted into one or more data frames. The data frames are then communicated. For instance, data originated at, or at a device coupled to, the network infrastructure is formatted into one or more data frames and then sent by way of a radio link to the mobile station. Formatting, or other segmentation, of the data is performed at the network infrastructure and, once formatted or otherwise segmented, the data is sent by a source base transceiver station to the mobile station. When frame-formatted data is communicated, certain of the communication systems utilize an acknowledgment scheme, such as an ARQ scheme. In an ARQ scheme, a receiving station acknowledges receipt of data with an affirmative acknowledgment (ACK) of successful communication of the data or a negative acknowledgment (NACK) indicating unsuccessful completion of communication of the data.

Problems with communication of such frame-formatted data in a mobile communication system which uses an ARQ scheme, or other similar scheme, might occur. When a handover of communications from a first target entity to a target entity is effectuated during the time period in which a block of data is in the process of being sent to the mobile station, a portion of the data block may not have been affirmed to have been successfully delivered to the mobile station. This portion of the data block must be recommunicated to the mobile station by the target entity subsequent to handover of communications thereto. If the location at which the data is formatted, or otherwise segmented, is located together with the first target entity from which the data is communicated to the mobile station prior to the handover, a significant amount of data would regularly have to be forwarded from the first target entity to the second target entity upon handover of communications.

A high-speed data link would need to be installed between the first and second target entities to ensure that the data is timely forwarded to the second target entity.

If a manner could be provided by which to provide a manner by which better to forward data to a second target entity pursuant to handover of communications to the second target entity, improved communication rates, without the use of a high-speed datalink, would be possible.

It is in light of this background information related to the communication of data in a mobile radio communication system that the significant improvements of the present invention have evolved.

SUMMARY OF THE INVENTION

The present invention, accordingly, advantageously provides apparatus, and an associated method, by which to facilitate communication of a data block to a mobile station in which communications with the mobile station are handed off from a first target entity to a second target entity.

Through operation of an embodiment of the present invention, a manner is provided by which to transfer a portion of the data block, previously delivered to the first target entity, but not yet affirmatively communicated to the mobile station, to the second target entity. Other portions of the data block, not yet delivered to the first target entity, are instead routed to the second target entity pursuant to the handover of the communications to the target entity.

In one aspect of the present invention, a mobile communication system is operable to communicate a data block of digital data to a mobile station. The data block is segmented by a segmentation unit which is located at a device other than the first target entity and the second target entity. Because the segmentation unit is positioned separate from the first target entity, when a handover is effectuated during communication of the data block to a mobile station, only portions of the data block, already delivered to the first target entity and not yet acknowledged or not yet transmitted, need to be routed from the first target entity to the second target entity. Thereby, lesser amounts of data are required to be transferred between the first and second target entities pursuant to a handover of communications. The need otherwise to use a high-speed data link between the first and second target entities to ensure timely forwarding of the data is obviated.

In another aspect of the present invention, a segmentation and distribution unit (SDU) is positioned at a base station gateway (BSGW), thereby to be positioned separate from both a first target entity and a target entity, such as a source cell gateway and a target cell gateway. The SDU is operable to segment the data block according to a selected segmentation scheme. Once segmented, the data block is forwarded, portion-by-portion, to the first target entity. When a handover of communications is effectuated from the first target entity to the second target entity, remaining portions of the data block, not yet forwarded to the first target entity, are instead forwarded to the second target entity. Because the data block is forwarded on a portion-by-portion basis to the first target entity and only un-acknowledged or not-yet-transmitted data needs to be forwarded to the second target entity, the amount of data which must be forwarded by the first target entity to the second target entity pursuant to a handover of communications is likely to be less than if all of the data block had been forwarded to the first target entity.

In another aspect of the present invention, portions of the data block forwarded to the first target entity are buffered at a buffer, thereafter to be communicated from the first target entity, such as from a base transceiver station (BTS) thereof to the mobile station. When the data is successfully communicated to the mobile station, and acknowledgment is returned to the first target entity pursuant to a conventional acknowledgment scheme, such as an ARQ acknowledgment scheme. The portions of the data buffered at the buffer remain buffered thereat until a positive acknowledgment is returned by the mobile station indicating successful communication of the portion of the data to the mobile station. As the indications of the successful completion of the communication of the data to the mobile station are detected at the first target entity, such data is no longer required to be buffered at the buffer.

When a handover of communications is initiated, such as pursuant to a MAHO (mobile-assisted handover) procedure, data remaining at the buffer includes data not yet communicated to the mobile station or data not affirmatively acknowledged to have been delivered successfully to the mobile station. Such data is provided to a data forwarder to be forwarded therefrom to the second target entity. Once delivered to the second target entity, the data remains available for retransmission to the mobile station, if necessary.

In one implementation, the mobile communication system is operable generally pursuant to a CDMA 2000 (code-division, multiple-access 2000) standard specification which provides for the communication of digital data using an ARQ acknowledgment scheme pursuant to 1XTREME operation. A segmentation and distribution unit (SDU) is positioned at a base station gateway, separate from, and coupled to, a first target cell gateway and a second target cell gateway. A data block to be communicated to a mobile station operable in the communication system is segmented by the SDU. Portions of the data block, once segmented, are forwarded to a first target cell gateway. The portions forwarded to the first target cell gateway are buffered at a buffer of the first target cell gateway and subsequently communicated to the mobile station. When a handover of communications is to be effectuated during a communication session in which the data block is in the process of being communicated to the mobile station, portions of the data block buffered at the first target cell gateway are forwarded to the second target cell gateway. Data portions of the data block not previously delivered by the base station gateway to the first target cell gateway are routed directly to the second target cell gateway. Because the SDU and the first and second target cell gateways are located at separate entities of the network infrastructure, reduced amounts of data need to be forwarded by the first target cell gateway to the second target cell gateway. And, as a result, high speed data lines interconnecting the first and second target cell gateways are obviated.

In these and other aspects, therefore, apparatus, and an associated method, are provided for a mobile communication system having a mobile station and a network portion. The network portion has a first target entity and a second target entity. The mobile station at least receives a data block sent by the network portion to the mobile station pursuant to a communication session. A portion of the data block is transferred from the first target entity to the second target entity, thereby to permit communication of the data block to the mobile station when a communication handover is effectuated from the first target entity to the second target entity. A first target-entity buffer is positioned at the first target entity. The first target-entity buffer buffers the portion of the data block at the first target entity at least prior to successful delivery of the portion of the data block to the mobile station. A data forwarder is positioned at the first target entity. The data forwarder is coupled to the first target-entity buffer and to the second target entity. The data forwarder forwards the portion of the data block to the second target entity upon effectuation of the communication handover to the second target entity.

A more complete appreciation of the present invention and the scope thereof can be obtained from the accompanying drawings which are briefly summarized below, the following detailed description of the presently-preferred embodiments of the invention and the appended claims.

DETAILED DESCRIPTION

Figure 1:
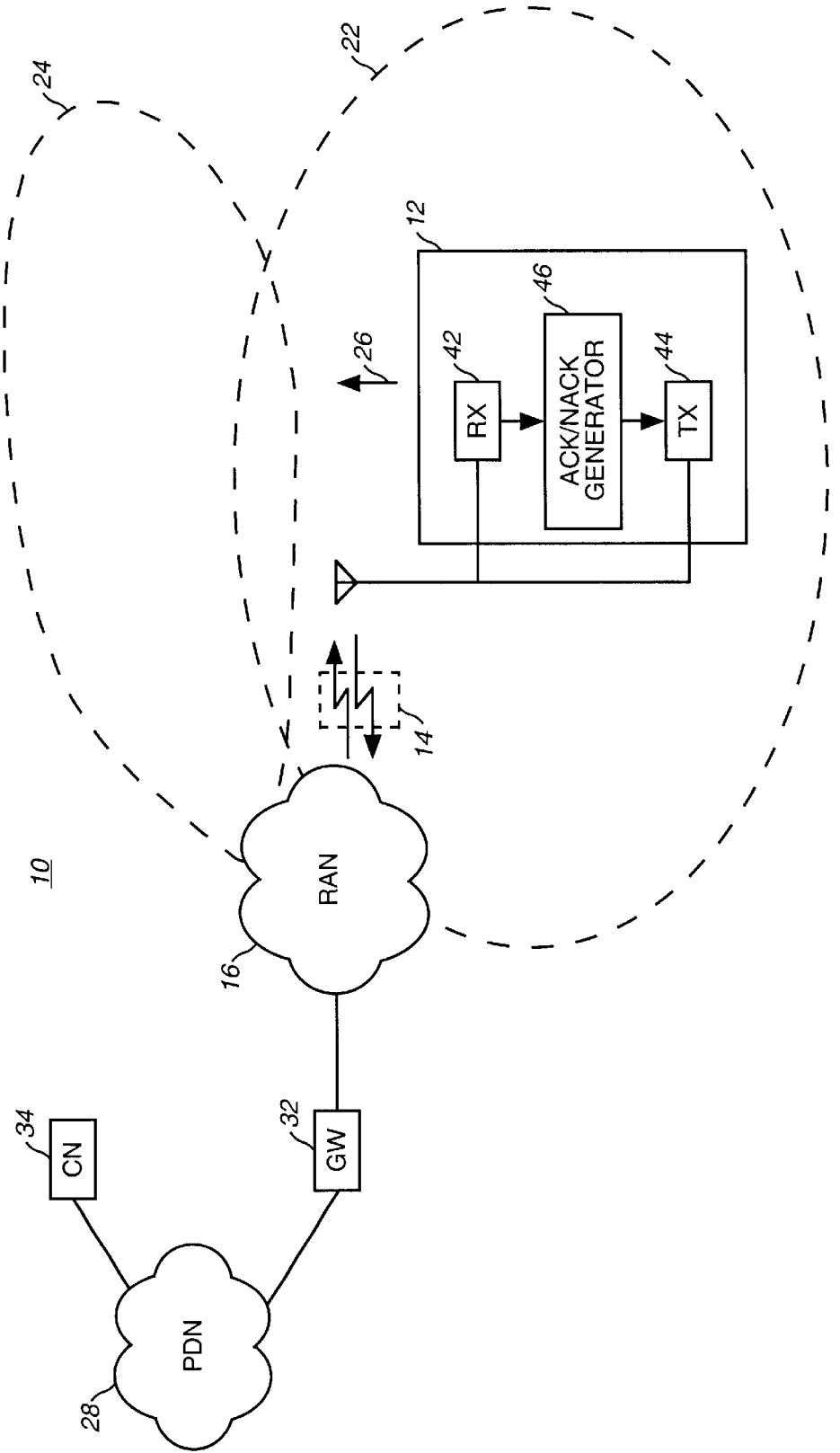
FIG. 1 illustrates a functional block diagram of an exemplary communication system in which an embodiment of the present invention is operable.

Referring first to FIG. 1, a communication system, shown generally at 10, is operable to communicate a data block to a mobile station 12 over an air interface defined upon a radio link 14. In the exemplary embodiment shown in the figure, the mobile station 12 is operable pursuant to a so-called 3G (third generation) CDMA 2000 (code-division, multiple-access 2000) communication standard which provides for 1XTREME data communications. In other implementations, the communication system is operable pursuant to other communication standards, and an embodiment of the present invention is analogously also operable in a communication system constructed to be operable pursuant to another communication standard.

The communication system includes a network portion, including a radio part, here formed of a radio access network (RAN) 16. The radio access network in the exemplary implementation is also operable pursuant to the 3G CDMA 2000 standard which provides for 1XTREME data communications.

Elements of the radio access network define cells which form coverage areas within which communications with mobile stations, such as the mobile station 12, are permitted. In the figure, two cells are shown, a cell 22 and a cell 24. Initially, the mobile station 12 is positioned in the cell 22. When the mobile station is moved in the direction indicated by the arrow 26, continued movement of the mobile station in such direction causes the mobile station subsequently to be positioned at the cell 24.

As the mobile station leaves the cell 22 and enters the cell 24, a handover of communications is typically effectuated to permit continued communications with the mobile station when the mobile station exits the coverage area defined by the cell 22 and becomes positioned in the coverage area defining the cell 24. A request to handover communications is initiated, for instance, pursuant to a MAHO (mobile-assisted handover) procedure carried out by the mobile station. Operation of the embodiment of the present invention facilitates continued communication of the data block communicated by the network portion of the communication system to the mobile station as communications are handed off pursuant to a handoff procedure.

The network portion of the communication system is further shown to include a packet data network 28, such as the internet backbone. The packet data network is connected to the radio access network by way of a gateway 32. A correspondent note (CN) 34 is here shown to be connected to the packet data network. A communication path is formable between the correspondent node and the mobile station by way of the packet data network, the gateway, the radio access network, and the radio link. The data block which is communicated to the mobile station by the radio access network pursuant to an embodiment of the present invention is originated, for example, at the correspondent node 34.

The mobile station 12 includes a receive circuitry portion 42, a transmit circuitry portion 44, and an acknowledgment generator 46. The acknowledgment generator forms a portion of, for example, control circuitry of the mobile station. The data block communicated to the mobile station is sent pursuant to an ARQ scheme in which individual segments of the data block are sent to the mobile station, and operated upon by the receive circuitry portion thereof. When the segment of the data block is successfully received and operated upon by the received circuitry portion, the acknowledgment generator generates an acknowledgment indicating successful completion of communication of the segment of the data to the mobile station. The acknowledgment is provided to the transmit circuitry portion 44. The transmit circuitry portion generates an ACK (acknowledgment) which is returned to the radio access network. In conventional manner, if the receive circuitry is unable to operate successfully upon the segment of data, a negative acknowledgment (NACK) signal is generated and returned to the radio access network. Once returned to the radio access network, an NACK indication precipitates retransmission of the segment of data.

Figure 2:
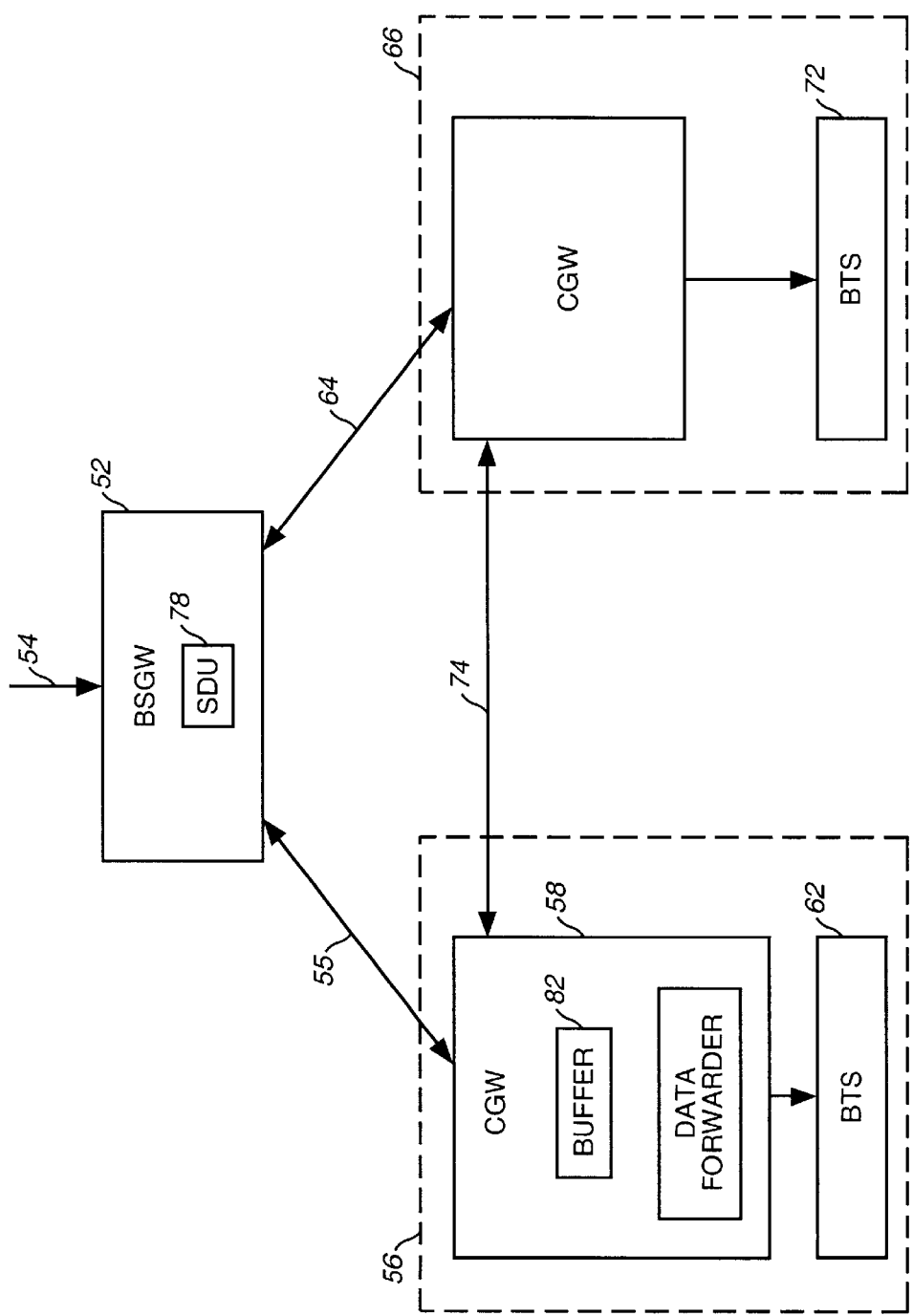
FIG. 2 illustrates a functional block diagram of a portion of the communication system shown in FIG. 1 and which includes an embodiment of the present invention.

FIG. 2 illustrates elements of the radio access network 16 forming a portion of the communication system 10, shown in FIG. 1. A base station gateway (BSGW) 52 is coupled to receive a data block on the line 54. The line 54 is representative, for example, of a line extending from the gateway 32 (shown in FIG. 1) upon which data originated at the correspondent node 34 (also shown in FIG. 1) is provided to the radio access network for subsequent communication to the mobile station 12.

The base station gateway is coupled by way of an interface 55 with a first target entity 56. The first target entity is here shown to include a first target cell gateway (CGW) 58 and a first target-cell base transceiver station (BTS) 62. The base transceiver station 62 defines a coverage area forming the cell 22 (shown in FIG. 1).

The base station gateway is also coupled by way of an interface 64 with a second target entity 66. The second target entity includes a second target cell gateway (CGW) 68 and a second target base transceiver station 72. The second target base transceiver station defines a coverage area forming the second target cell 24 (shown in FIG. 1). An interface 74 is also shown in the figure, extending between the first target cell gateway and the second target cell gateway.

Pursuant to an embodiment of the present invention, the base station gateway includes a segmentation and distribution unit (SDU) 78. The SDU is positioned thereby remote from the first target entity 56 and also remote from the second target entity 66. The SDU is operable to perform segmentation and distribution operations including, for instance, formatting of the data block into data frames. Pursuant to a communication session, portions of the data block, such as a frame, or a portion thereof, is forwarded by the SDU of the base station gateway to the first target cell gateway 58.

The first target cell gateway includes a buffer 82 which buffers the portions of the data block provided thereto by way of the interface 55 from the SDU. The buffered portion of the data is forwarded to the base transceiver station 62 to be transmitted therefrom to the mobile station pursuant to the ARQ communication scheme. When an acknowledgment affirming successful communication of the transmitted portion of the data to the mobile station is detected at the first target entity, that data portion is not again communicated to the mobile station and the buffer of that portion of the data is removed. Subsequent portions of the data are then communicated to the mobile station in similar manner. And, as appropriate, additional portions of the data block are provided by the SDU to the first target cell gateway.

When the mobile station returns a negative acknowledgment indicating unsuccessful communication of the portion of the data block thereto, the portion of the data is rescheduled for transmission to the mobile station and subsequently retransmitted thereto. And, if no acknowledgment, neither an affirmative acknowledgment or a negative acknowledgment is returned to the first target entity, the portion of the data is correspondingly also rescheduled for retransmission to the mobile station.

If, however, a handover of communications is requested, granted, and effectuated during the communication of the data block pursuant to the communication session, the data buffered at the buffer 82 must be forwarded on to the second target cell gateway 68. Pursuant to operation of an embodiment of the present invention, the cell gateway further includes a data forwarder 84 coupled to the buffer 82. The data forwarder retrieves the data buffered at the buffer and forwards the data on to the second target cell gateway 68 by way of the interface 74. Once delivered to the second target cell gateway, corresponding structure located thereat is utilized to transmit the data to the mobile station by way of the base transceiver station 72. Other portions of the data block remaining at the buffer of the base station gateway are delivered to the second target cell gateway directly by way of the interface 64.

Because the SDU is located at the base station gateway rather than at a cell gateway, upon effectuation of a handover of communications from the first target entity to the second target entity, lesser amounts of data need to be forwarded from the first target entity to the second target entity than if the SDU is instead located at the cell gateway. And, significantly, the amount of data sent between the base station gateway and the second target entity, upon handover, is reduced.

Figure 3:
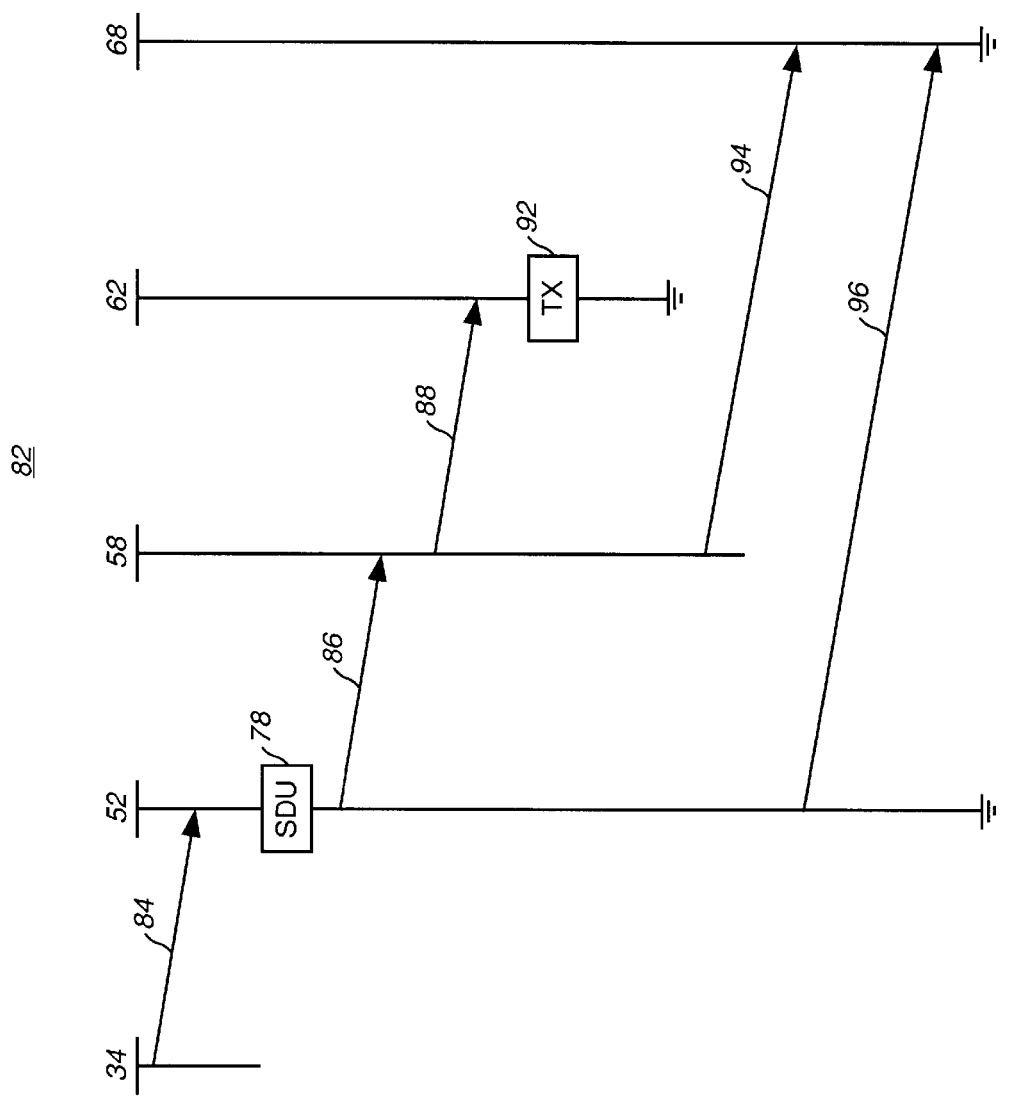
FIG. 3 illustrates a message sequence diagram illustrating the signaling generated during operation of an embodiment of the present invention.

FIG. 3 illustrates a message sequence diagram, shown generally at 82, which illustrates signaling generating during operation of the radio access network of the communications system 10 shown in FIG. 1. A data block originated at a correspondent node is provided, as indicated by the segment 84, to the base station gateway 52. Segmentation and distribution of the data block is provided by the SDU located at the base station gateway. Portions of the data, once segmented, are provided, indicated by the segment 86, to the first target cell gateway 58. The portions of the data are thereafter provided to the base transceiver station 62, indicated by the segment 88, and, then, transmitted therefrom, indicated by the block 92.

When a handover of communications is effectuated, portions of the data buffered at the first target cell gateway are forwarded, as indicated by the segment 94, to the second target cell gateway 68. And, as indicated by the segment 96, portions of the data block remaining at the base station gateway are forwarded therefrom to the second target cell gateway. Thereafter, the data is communicated to the mobile station to the second target base transceiver station of the second target entity.

Figure 4:
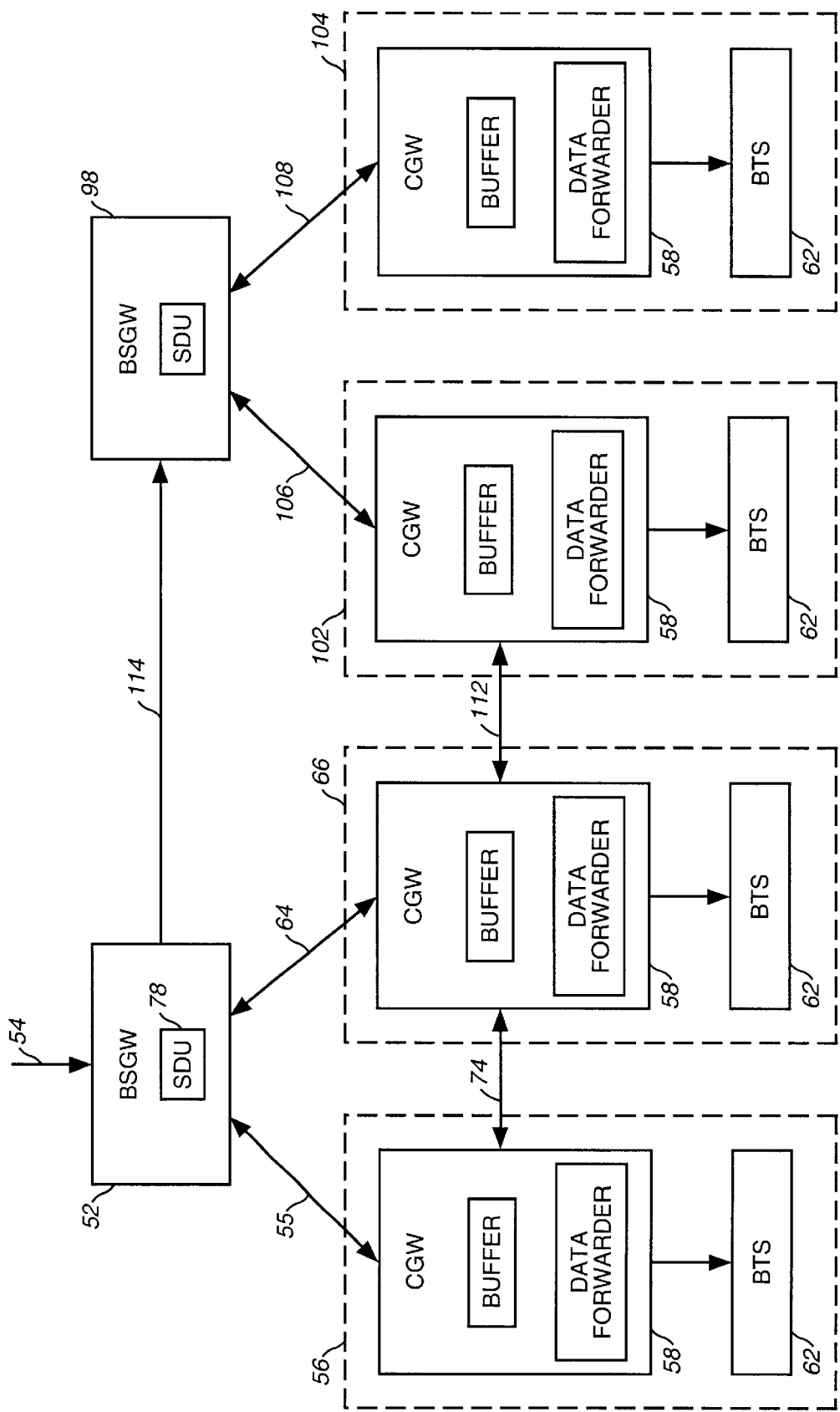
FIG. 4 illustrates a functional block diagram, similar to that shown in FIG. 2, but here including a further embodiment of the present invention.

FIG. 4 illustrates elements of the radio access network 16 forming a portion of the communication system 10, shown in FIG. 1. Analogous to the portion of the communication system shown in FIG. 2, the portion illustrated in FIG. 4 again is shown to include a base station gateway 52 and first and second target entities 56 and 66. Structure and functionality contained within such elements are commonly-referenced and are operable in manners analogous to their operation described with respect to FIG. 2.

Here, an additional base station gateway 98 and additional target entities, a third target entity 102 and a fourth target entity 104 are further shown. The third target entity is connected to the base station gateway 98 by way of an interface 106, and the fourth target entity 104 is coupled to the base station gateway 98 by way of an interface 108. The target entities 102 and 104 also include structure and functional entities analogous to the structure and functional entities forming the first and second target entities 56 and 64. The corresponding structure and entities of these additional target entities is commonly referenced with the corresponding elements of the first and second target entities. An interface 112 is also shown to interconnect the second and third target entities 66 and 102, respectively.

Pursuant to a further embodiment of the present invention, when a handover of communications is effectuated between target entities associated with the different ones of the base station gateways 52 and 98, transfer of the data to the target entity to which the communications are to be handed over is effectuated in a manner to increase the transfer rate relative to operation of a conventional system. Here, portions of the data, already delivered to a target entity, here, the second target entity 66, but not yet affirmed to have been successfully delivered to the mobile station, is forwarded, by way of the interface 112 to the target entity 102. An additional interface 114 interconnects the base station gateway 52 and the base station gateway 98. Portions of data not yet delivered by the base station gateway 52 to the target entity 66 are transferred by way of the interface 114 to the base station gateway 98. Thereby, all of the data which is to be communicated to the mobile station is transferred to the base station gateway 98 or, as appropriate, directly to the target entity 102. Thereby, the rate at which the data can subsequently be communicated to the mobile station to effectuate the communication service pursuant to which the data is communicated to effectuate the service.

Figure 5:
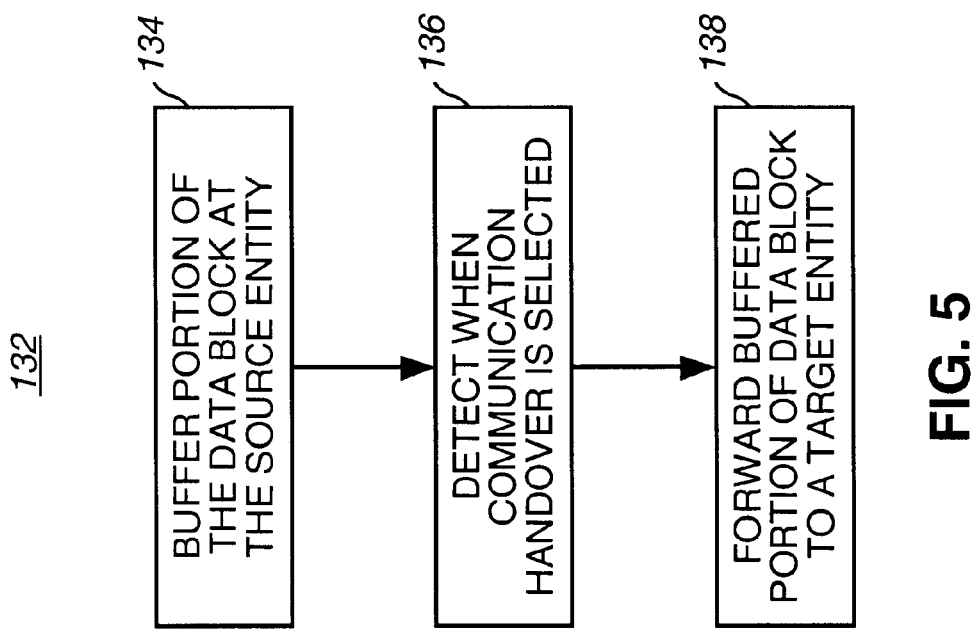
FIG. 5 illustrates a method flow diagram listing the method of operation of the method of an embodiment of the present invention.

FIG. 5 illustrates a method flow diagram 132. The method 132 transfers a portion of a data block from a first target entity to a second target entity pursuant to a handover of communications to facilitate communication of the portion of the data block to a mobile station.

First, and as indicated by the block 134, the portion of the data block is buffered at the first target entity at least prior to successful delivery of the portion of the data block to the mobile station. Then, and as indicated by the block 136, detection is made of when a handover of communications is selected to be effectuated between the first target entity and the second target entity. Then, and as indicated by the block 138, the buffered portion of the data block is forwarded to the second target entity upon detection that the handover of communications is to be effectuated.

Thereby, the data portion which is not affirmatively acknowledged to have been forwarded to the mobile station is provided to the second target entity, thereafter to be communicated therefrom to the mobile station.

The preferred descriptions are of preferred examples for implementing the invention, and the scope of the invention should not necessarily be limited by this description. The scope of the present invention is defined by the following claims.

What is claimed is:

1. In a mobile communication system having a mobile station and a network portion, the network portion having a first target entity and a second target entity and a base station gateway coupled to the first target entity and to the second target entity, the mobile station at least for receiving a data block sent by the network portion to the mobile station pursuant to a communication session, an improvement of apparatus for transferring a portion of the data block from the first target entity to the second target entity, thereby to permit communication of the data block to the mobile station when a communication handover is effectuated from the first target entity to the second target entity, said apparatus comprising:

an SDU (segmentation and distribution unit) embodied at the base station gateway remote from, but coupled to, the first and second target entities, respectively said SDU for segmenting the data block into at least a first data frame, the at least the first data frame forming at least part of the portion of the data block said SDU for successively forwarding data frames of the at least the first data frame to the first target entity pursuant to the communication session while the mobile station is positioned within coverage of the first target entity and said SDU for successively forwarding data frames of the at least the first data frame to the second target entity pursuant to the communication session while the mobile station is positioned within coverage of the second target entity, subsequent to the communication handover;

a first target-entity buffer positioned at the first target entity, said first target-entity buffer for buffering the at least the first data frame forming at least a portion of the data block at the first target entity at least prior to successful delivery of the at least the first data frame forming the at least the portion of the data block to the mobile station; and a data forwarder positioned at the first target entity, coupled to said first target-entity buffer, and to the second target entity, said data forwarder selectably for forwarding the at least the first data frame forming the portion of the data block to the second target entity upon effectuation of the communication handover to the second target entity, the at least the first data frame forwarded to the second target entity pursuant to the communication handover at least when the successful delivery of the at least the first data frame remains unacknowledged by the mobile station.

2. The apparatus of claim 1 wherein the network portion comprises a first target cell gateway, the first target cell gateway forming a portion of the first target entity, and wherein said first target-entity buffer is located at the first target cell gateway.

3. The apparatus of claim 2 wherein said data forwarder is located at the first target cell gateway.

4. The apparatus of claim 1 wherein the data block sent by the network portion to the mobile station is sent pursuant to an ARQ scheme and wherein the at least the first data frame into which said SDU segments the portion of the data block and that is buffered at said first target-entity buffer comprises at least one of:

data portions of the data block, previously sent to the mobile station, but for which acknowledgment of successful delivery thereof is not yet returned, and data portions of the data block not-yet-transmitted to the mobile station.

5. The apparatus of claim 4 wherein the mobile communication system is operable generally pursuant to a CDMA 2000 (code-division, multiple-access) operating specification and using an ARQ scheme and wherein the data portions of the data block, previously sent to the mobile station, but for which acknowledgment of successful delivery thereof is not yet returned, comprises data portions for which NACK (no acknowledgment) indications have been returned by the mobile station.

6. The apparatus of claim 5 wherein the data portions of the data block, previously sent to the mobile station, but for which acknowledgment of successful delivery thereof is not yet returned, further comprises data portions for which neither the NACK indications nor ACK (acknowledgment) indications have been returned by the mobile station.

7. The apparatus of claim 1 further comprising a second target-entity buffer located at the second target entity, the at least the first data frame forming the portion of the data selectably forwarded by said data forwarder to the second target entity buffered at the second target-entity buffer once received at the target entity.

8. The apparatus of claim 7 wherein the second target entity comprises a second target-entity gateway and wherein said second target-entity buffer is located at the second target-entity gateway.

9. The apparatus of claim 8 wherein the first target entity comprises a first target cell gateway, wherein said first target-entity buffer is located at the first target cell gateway, and wherein the at least the first data frame forming at least the part of the data block segmented at the base station gateway is forwarded, prior to the effectuation of the communication handover to the second target entity, from said first target-entity buffer to said second target-entity buffer of the second target-entity gateway to form at least a part of the portion of the data block buffered thereat.

10. The apparatus of claim 9 wherein the at least the first data frame forming the parts of the data block selectably forwarded by the base station gateway to the second target cell gateway are sent to the mobile station irrespective of delivery at the second target entity of the portion of the data block forwarded by said data forwarder.

11. The apparatus of claim 1 wherein the network portion further comprises a second base station gateway coupled to the first base station gateway, the first target entity coupled to the first base station gateway and the second target entity coupled to the second base station gateway, and wherein said apparatus further comprises:

a first base station buffer positioned at the first base station gateway, said first base station buffer for buffering a non-delivered part of the data block, prior to delivery to the first target-entity buffer.

12. The apparatus of claim 11 wherein said apparatus further comprises:

a second base station buffer positioned at the second base station gateway, said second base station buffer for buffering the non-delivered part of the data block subsequent to handover of communications to the second target entity.

13. The apparatus of claim 12 wherein said data forwarder further initiates forwarding of the non-delivered part of the data block from the first base station buffer to the second base station buffer.

14. In a method of communicating in a mobile communication system having a mobile station and a network portion, the network portion having a first target entity, a second target entity, and a base station gateway coupled to the first target entity and to the second target entity, the mobile station at least for receiving a data block sent by the network portion to the mobile station pursuant to a communication session, an improvement of a method for transferring a portion of the data block from the first target entity to the second target entity, thereby to permit communication of the data block to the mobile station when a communication handover is effectuated from the first target entity to the second target entity, said method comprising:

segmenting the data block into at least a first data frame at the base station gateway, the at least the first data frame forming the at least part of the portion of the data block and forwarding data frames of the at least the first data frame to the first target entity pursuant to the communication session while the mobile station is positioned within coverage of the first target entity and forwarding data frames of the at least the first data frame to the second target entity pursuant to the communication session while the mobile station is positioned within coverage of the second target entity subsequent to the communication handover;

buffering the portion formed of the at least the first data frame of the data block at the first target entity at least prior to successful delivery of the portion of the data block to the mobile station;

detecting when a handover of communications is selected to be effectuated between the first target entity and the second target entity; and forwarding the portion formed of the at least the first data frame of the data block buffered during said operation of buffering to the second target entity upon detection that the handover of communications is to be effectuated, at least when the successful delivery of the at least the first data frame forming the portion of the data block buffered during said operation of buffering remains unacknowledged by the mobile station.

15. The method of claim 11 wherein the first target entity comprises a first target cell gateway and wherein said operations of buffering and forwarding are performed at the first target cell gateway.

16. The method of claim 14 wherein the data block sent by the network portion to the mobile station is sent pursuant to an ARQ scheme, said operation of buffering further comprising maintaining buffering of the portion of the data block at least until an ACK (acknowledgment) indication is returned indicating successful delivery of the portion of the data to the mobile station.

17. The method of claim 16 comprising the additional operation of monitoring return of the ACK indication by the mobile station.

* * * * *